(12) United States Patent
Niemela

(10) Patent No.: US 6,247,150 B1
(45) Date of Patent: Jun. 12, 2001

(54) AUTOMATIC RETRANSMISSION WITH ORDER OF INFORMATION CHANGED

(75) Inventor: Kari Niemela, Oulu (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/516,972

(22) Filed: Feb. 29, 2000

Related U.S. Application Data

(63) Continuation of application No. PCT/FI99/00567, filed on Jun. 24, 1999.

(30) Foreign Application Priority Data

Jul. 3, 1998 (FI) ............................................ 981544

(51) Int. Cl.$^7$ .................................................. G06F 11/00
(52) U.S. Cl. ............................ 714/701; 714/748; 370/337
(58) Field of Search ................................. 714/701, 748, 714/746; 370/337

(56) References Cited

U.S. PATENT DOCUMENTS

| | | | |
|---|---|---|---|
| 4,677,612 | * 6/1987 | Olson et al. ............................ | 370/85 |
| 4,718,066 | 1/1988 | Rogard . | |
| 4,939,731 | 7/1990 | Reed et al. . | |
| 5,023,905 | * 6/1991 | Wells et al. ............................ | 379/96 |
| 5,563,895 | 10/1996 | Malkamaki et al. . | |
| 5,699,365 | * 12/1997 | Klayman et al. ...................... | 714/708 |
| 5,729,541 | * 3/1998 | Hamalainen et al. ............... | 370/337 |

FOREIGN PATENT DOCUMENTS

| | | |
|---|---|---|
| 2 320 869 | 7/1998 | (GB) . |
| 504 396 | 10/1995 | (SE) . |
| 98/05140 | 2/1998 | (WO) . |
| 98/07247 | 2/1998 | (WO) . |
| 98/49796 | 11/1998 | (WO) . |

OTHER PUBLICATIONS

12/99, International Search Report for PCT/FI99/00567.

* cited by examiner

*Primary Examiner*—Phung M. Chung
(74) *Attorney, Agent, or Firm*—Altera Law Group, LLC

(57) ABSTRACT

The invention relates to packet transfer over a radio path in accordance with the ARQ protocol. It is based on the idea that instead of repeating in the retransmission the same bursts, i.e. the same information contained in the bursts in the same order, the order of the information is changed. This is done in such a way that the retransmission is not sent from one retransmission to another similarly interleaved, but the interleaving is changed. As a result, the content of the part that was incorrectly received in the previous transmission has been transferred to a new location. Hence, when the soft values of the channel corrector are combined, the probability of correct reception of this part in the retransmission greatly increases. Thereby the probability for error-free detection of the entire data packet notwithstanding the interference in the radio path is high.

10 Claims, 4 Drawing Sheets

| 1 | LSB | A | MSB | S | TRAINING SEQUENCE | S | LSB | B | MSB |
| 2 | LSB | C | MSB | S | TRAINING SEQUENCE | S | LSB | D | MSB |
| 3 | LSB | E | MSB | S | TRAINING SEQUENCE | S | LSB | F | MSB |
| 4 | LSB | G | MSB | S | TRAINING SEQUENCE | S | LSB | H | MSB |

FIG. 6

| 1 | LSB | F | MSB | S | TRAINING SEQUENCE | S | LSB | G | MSB |
| 2 | LSB | H | MSB | S | TRAINING SEQUENCE | S | LSB | A | MSB |
| 3 | LSB | B | MSB | S | TRAINING SEQUENCE | S | LSB | C | MSB |
| 4 | LSB | D | MSB | S | TRAINING SEQUENCE | S | LSB | E | MSB |

FIG. 7

AUTOMATIC RETRANSMISSION WITH ORDER OF INFORMATION CHANGED

This application is a continuation of international application Ser. No. PCT/FI99/00567, filed Jun. 24, 1999.

FIELD OF THE INVENTION

The present invention relates to transmission of data packets in a telecommunications network in which the transmitting end encodes the data blocks, divides them into smaller parts for interleaving, and transmits the parts in the form of bursts to the radio path, and in which the receiving end receives the bursts and deinterleaves them to reconstruct the original coded block. After the receiving end has received a faulty data packet, it requests the transmitting end to retransmit the packet. The retransmission protocol is ARC (Automatic Repeat Request).

BACKGROUND OF THE INVENTION

The current mobile networks enable bidirectional speech transmission between two parties, each of which can be a subscriber in a mobile network when the call travels within the same mobile network or through a circuit-switched PSTN/ISDN network from one mobile network to another. One of the subscribers can also be a subscriber in a circuit-switched PSTN/ISDN network. In any case, the connection is always circuit-switched and it is reserved for the use of these two parties for the entire duration of the data transmission. The known GSM system is a good example of a circuit-switched mobile network.

The mobile network was originally designed for effective speech transmission, and in current networks the data transmission rates are indeed quite low. Recently, mobile station users have been afforded an opportunity to attach to a packet-switched internet network through a circuit-switched mobile network. The terminal equipment may be the actual mobile station, comprising the suitable software, or the terminal may also be a computer attached to the mobile station, in which case the mobile station . . . use for speech transmission. Such cordless data transmission is attended by the drawback of slow data transmission, as GSM only offers the rate 9.6 kbit/s for data transmission.

This situation is improved by the GPRS (General Packet Radio Service) system using virtual circuits, which is currently being specified by ETSI (European Telecommunications Standards Institute). The purpose of GPRS services is to operate independently of the present circuit-switched services and particularly to utilize the unused resources of circuit-switched traffic. The GPRS system partly uses the Internet protocols, and hence a GPRS network can be directly connected to the Internet. The system has been logically implemented by superimposing it on the GSM system, adding two new network elements. The mobile station can be made bifunctional in such a way that it can serve as a normal GSM phone and as a GPRS phone relaying packet data.

Since both in a packet-switched mobile network and in a circuit-switched mobile network the links between mobile stations and base stations are radio links, the links are suspect to similar interference.

Simultaneous connections cause mutual interference the magnitude of which is dependent on the channels used for the connection, the geographical location of the connections, and the transmission power employed. These can be influenced by planned channel allocation to different cells which takes interference into account, and by transmission power control. The distance at which the same channel can be reused while the signal carrier to interference ratio (CIR, C/I) remains acceptable is called the noise distance. FIG. 1 illustrates the effect of an interference signal at the reception. A burst signal (wanted signal) is anticipated to arrive in a reception time slot. At some phase thereof, often in the middle, the signal comprises a training sequence known to the receiver, in accordance with which the receiver adjusts its channel corrector. If an interference signal of the same frequency arrives simultaneously, it destroys the wanted signal entirely or at least partly. If the interfering signal arrives with a delay as in the figure, it is nearly impossible to detect the bits at the end of the wanted signal. If part of the interfering signal arrives simultaneously as the part comprising the training sequence is being received, the receive signal is completely lost. The interfering signal can be a multipath-propagated component of the same transmission, or it can be a signal originating from a different source but arriving at the frequency of the wanted signal.

Since the use of a higher CIR ratio than necessary in digital systems hardly improves connection quality, the transmission power used on the connections is dynamically controlled. The requisite power is dependent on channel fading between the mobile station and the base station, the interference caused by other connections, and ambient noise. Interference can also be diminished for example by using directional antennas, in which case the same signal level can be achieved at the receiver with lower transmission power.

Also Doppler shift causes interference in transmission. The frequency change produced thereby causes rotation of the received burst and impairs the accuracy of the channel estimate, calculated on the basis of the training sequence located in the middle of the burst, towards the end of the burst. This is illustrated in FIG. 2, in which the signal/noise ratio is good in the middle of the burst but deteriorates at the beginning and at the end.

In addition to the CIR representing the radio channel quality, the connection quality is influenced by the sensitivity of the information signal transferred over the channel to transmission errors arising in the radio channel. The information can be rendered more immune to transmission errors by processing the information prior to its transmission to the channel by channel coding and interleaving and by using re-transmission of faulty data frames.

This is illustrated in FIG. 3. In accordance with the figure, the transmitting end channel codes the transmit data in blocks, splits the blocks into smaller parts and changes the order of the parts (interleaving). Thereafter the data is transmitted in bursts through the radio interface to the receiving end, which performs the same operations in reverse order.

The purpose of channel coding is on the one hand to render the information transfer more immune to transmission interference and on the other hand to detect transmission errors. In channel coding, redundancy by means of which errors caused by the radio channel can be corrected and non-correctable errors detected at the signal receiving end is added to the actual user data to be transmitted. Whilst affording better interference immunity, channel coding increases the bandwidth requirement for information transfer.

The bit errors produced in the radio path are typically error bursts comprising a sequence of several bits. Individual bit errors are always easier to correct than a sequence of several successive erroneous bits. The probability of several successive erroneous bits occurring can be significantly reduced by bit interleaving, in which the order of the bits is scrambled in a predetermined manner prior to the sending of the signal to the radio path. When the relative order of the bits is restored to original at the receiving end, the bits in which radio path interference has caused errors are no longer adjacent, and thus the errors are easier to detect and correct. Whilst affording enhanced error correction and detection, interleaving produces a slight additional delay in the data transmission.

By using stronger channel coding and deeper interleaving, the user data can be transported to the receiver in a sufficiently error-free state even over a radio channel that is poorer than normal. Power control, interleaving and coding are the conventionally used means for correcting burst errors resulting from fading, interference and Doppler shift. In speech transmission, these measures are sufficient, as any small number of lost speech frames are replaced at the receiving end by constructing replacement frames in which the previously received speech parameters are utilized. In packet-switched networks which transfer mainly data records, these methods do not as such afford a sufficiently low bit error ratio.

Packet-switched radio networks can use the ARQ (Automatic Repeat Request) protocol—which is already used in fixed networks—or its derivatives, such as hybrid ARQ and Type II hybrid ARQ protocol. ARQ is error control method in which the receiving terminal comprises functions for detecting transmission errors and for automatic sending of a repeat request, in which case the transmitting terminal retransmits a character, code block or message until either it has been received correctly or the error is not eliminated even though retransmission has been repeated a predetermined threshold number of times.

In the Type II hybrid ARQ protocol, the data to be transmitted is divided into a number of data blocks in such a way that the data in a block is first transmitted in uncoded or lightly coded form. If the receiver requests retransmission, the block is repeated but coded in a different manner. By combining the blocks, the receiver can decode the transmission and find the original data. In hybrid ARQ II, an entire radio packet is always retransmitted instead of parts thereof.

If interleaving is used in addition to channel coding, the interleaving sequences should be short to avoid retransmitting already correctly received data for the sake of a few faulty points. On the other hand, interleaving would benefit from long interleaving sequences, since this would minimize the effect of the channel conditions. In combining retransmission and interleaving, it is inconvenient if the unit to be repeated is shorter than the interleaving sequence. At the moment when retransmission should be requested, it is impossible to know whether the error could later be corrected by cancelling the interleaving and convolutional coding. If errors are detected in the received packet after cancelling the interleaving and convolutional coding, all transmission units forming part of the interleaving sequence must be retransmitted, since after the decoding it is no longer known in which transmission unit the errors were located. A transmission unit herein denotes a protocol data unit of a physical layer, being any demonstrable resource in the transmission path. The most usual transmission unit is a burst.

In summary, it can be stated that various ARQ protocols have been developed with a view to resolving problems associated with the fading of a radio link. Many of these protocols are subject to the restriction that they do not make efficient use of the available radio resource and they prevent the use of efficient modulation and coding methods by means of which the utilization of available radio resources could be enhanced and the quality of service offered could be improved.

One method for removing the above restrictions is disclosed in Finnish Patent Application 971811, applicant Nokia Mobile Phones Ltd., filing data Apr. 28, 1997, which is not yet available to the public.

FIG. 4 shows the steps of the method. In step 410, the receiver receives information as to in what way the data to be transmitted is organized into packets and transmission units. At the transmitting end, the data is divided into parts of the size of a packet and interleaving and coding of data is performed on each packet. The packets are then divided into transmission units one by one, one packet into at least one transmission unit. The information on the organization of the data to be transmitted comprises at least the quantity and numbering of packets and the quantity and numbering of transmission units.

In step 411, the quality of the received transmission unit is checked, and if it meets the criteria, the signal is detected, i.e. the transmission unit is applied to a detector, step 412. If the quality is unsatisfactory, the transmission unit is first saved, step 413, and thereafter retransmission is requested, step 414. When the retransmitted transmission unit has been received, a combined transmission unit is formed, step 416. The quality of the combined transmission unit is checked, step 416, and if it is not satisfactory, the combination is saved, step 413, and retransmission is again requested.

If the quality of the combined transmission unit is sufficient, the unit is detected, step 412. In accordance with the method, the transmission unit originally sent and the retransmitted transmission units are combined prior to signal detection and retransmission is requested until the quality of the combined transmission unit is consistent with a predetermined quality level. Thereafter the signal is detected. In other words, the same transmission unit is accumulated prior to the detection for a time sufficient to make the quality of the cumulative transmission unit sufficiently high.

At the reception, transmission units are accumulated until the quality of the accumulation is acceptable. If the packet consists of a number of transmission units, they must all be received (and detected) correctly in order for it to be possible to deinterleave and decode the packet, step 417. Thereafter the correctness of the packet is checked, step 418. It is decided on the basis of the quality of the packet whether retransmission of the transmission units of the packet is requested. If, for example, a CRC check indicates the packet as faulty, retransmission of at least the transmission units having the poorest quality is requested and it is thereafter studied whether the packet becomes error-free.

The method in accordance with the above application is versatile and adaptable, but one of its drawbacks is that it requires a new protocol. It cannot be applied as such to existing packet data systems, such as the GPRS system. Another drawback is that since in most cases during the first transmitted packet the radio path interference has occurred at the start or end of the burst, retransmission and accumulation of transmission units is of no avail if the interference remains practically unchanged. In such a case, the retransmission is repeatedly received incorrectly. Furthermore, the method does not remove the problem created by the rotation of the burst due to the Doppler shift and the deterioration of the channel estimate caused by it at the beginning and at the end of the burst.

The object of the present invention is a method by which the need for retransmission is minimized and which will diminish the disadvantages caused by interference and the Doppler shift.

The invention is characterized by that which is disclosed in the independent claims.

SUMMARY OF THE INVENTION

The invention is based on the idea that instead of repeating in the retransmission the same bursts, i.e. the same information contained in the bursts in the same order, the order of the information is changed. This is done in such a way that the retransmission is not sent from one retransmission to another similarly interleaved, but the interleaving is changed. As a result, the content of the part that was incorrectly received in the previous transmission has been transferred to a new location. Hence, the probability of correct reception of this part in the retransmission greatly increases. When retransmissions are combined at the receiver for example in the manner disclosed in Finnish Patent Application 971811, the diversity gain will be made high and the probability for error-free detection of the entire data packet notwithstanding the interference in the radio path is high.

BRIEF DESCRIPTION OF THE DRAWINGS

The invention will be described in greater detail by means of the accompanying schematic drawings, in which FIG. 6 shows the content of the original bursts, FIG. 7 depicts the content of retransmitted bursts.

DETAILED DESCRIPTION OF THE INVENTION

Figure 5:
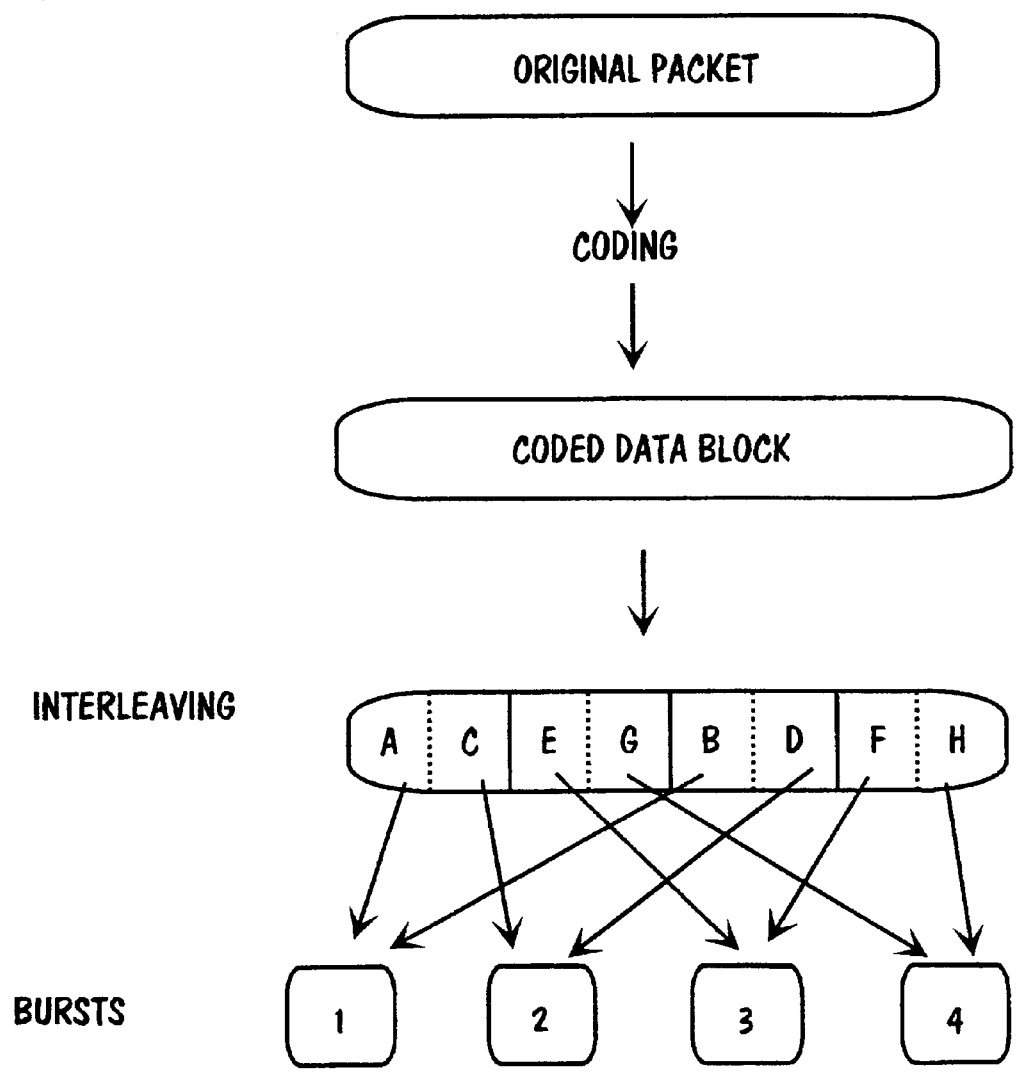
FIG. 5 illustrates operations in packet transmission.

FIG. 5 illustrates the transmission of a packet. The illustration is simplified and addresses one packet only. The original packet usually comprises a header field or fields and a data part. The packet is encoded by a coding method, resulting in a coded data block containing n bits. When desired, the order of the bits can thereafter be changed by pseudo-random scrambling of the block. Thereafter, the bits in the coded packet are divided into blocks of equal size in accordance with the interleaving depth, and each block is further divided into two parts. In the figure, a continuous vertical line has been used to separate the blocks, and the parts of the block are demarcated by a broken line. The parts of the blocks are named in the figure starting from the left: A-C, E-G, B-D and F-H. This naming, which may seem peculiar, is done for convenience reasons that will become apparent hereinbelow. In this example, the interleaving depth N is only 4 (the blocks are transmitted in four successive bursts), but the interleaving is performed on the parts of the blocks. Thus, parts A and B are transmitted in the same burst, parts C and D in the next burst, parts E and F in the third burst, and parts G and H in the fourth burst. In the figure, the bursts are successively numbered from one to four. As can be seen, the parts to be transmitted in the same burst are not successive, but there are three parts in between (=N−1).

In actual data transmission, considerably greater interleaving depths are used, one burst containing bits from a number of packets.

FIG. 6 shows what bits the bursts 1–4 in accordance with FIG. 5 contain. In this example, the training sequence is located in the middle of the burst, as is the case in the GSM and GPRS systems, and thus it divides the burst into two blocks. There is a stealing bit in front of and after the training sequence, indicating whether the half burst is temporarily reserved for any use other than transmission of bits of a data packet.

FIG. 6 graphically illustrates the fact that block A of the coded data packet divided into blocks, is located in the first half burst of the first burst, starting from the least significant bit LSB. Thus, the most significant bit MSB is located close to the training sequence. Respectively, block B is located in the second half burst of the first burst, starting from the least significant bit LSB. The most significant bit MSB is located at the end of the burst.

Correspondingly, blocks C and D are located in the half bursts of burst 2, blocks E and F in the half bursts of burst 3, and blocks G and H in the half bursts of burst 4.

Figure 1:
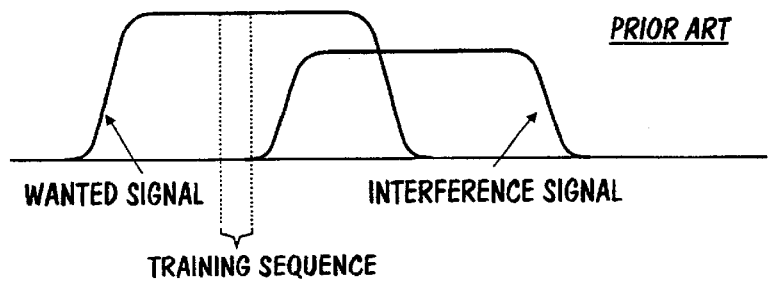
FIG. 1 illustrates the effect of interference on a wanted signal.
Figure 2:
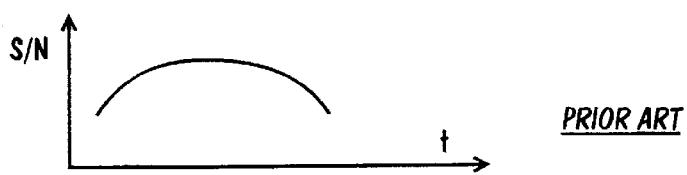
FIG. 2 shows the influence of the Doppler effect at the reception.
Figure 2:
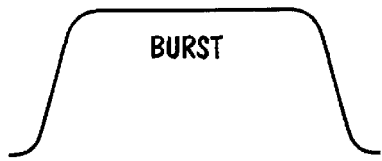
Figure 3:
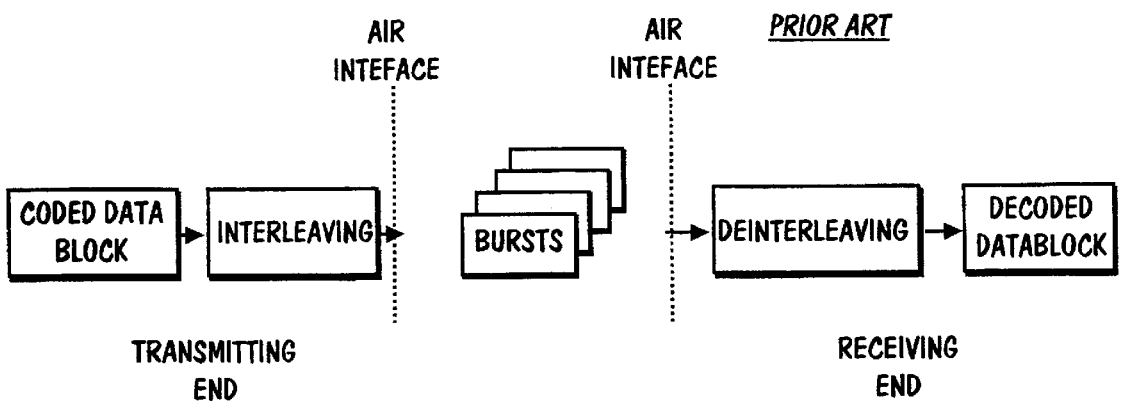
FIG. 3 depicts data processing at the transmission and at the reception.
Figure 4:
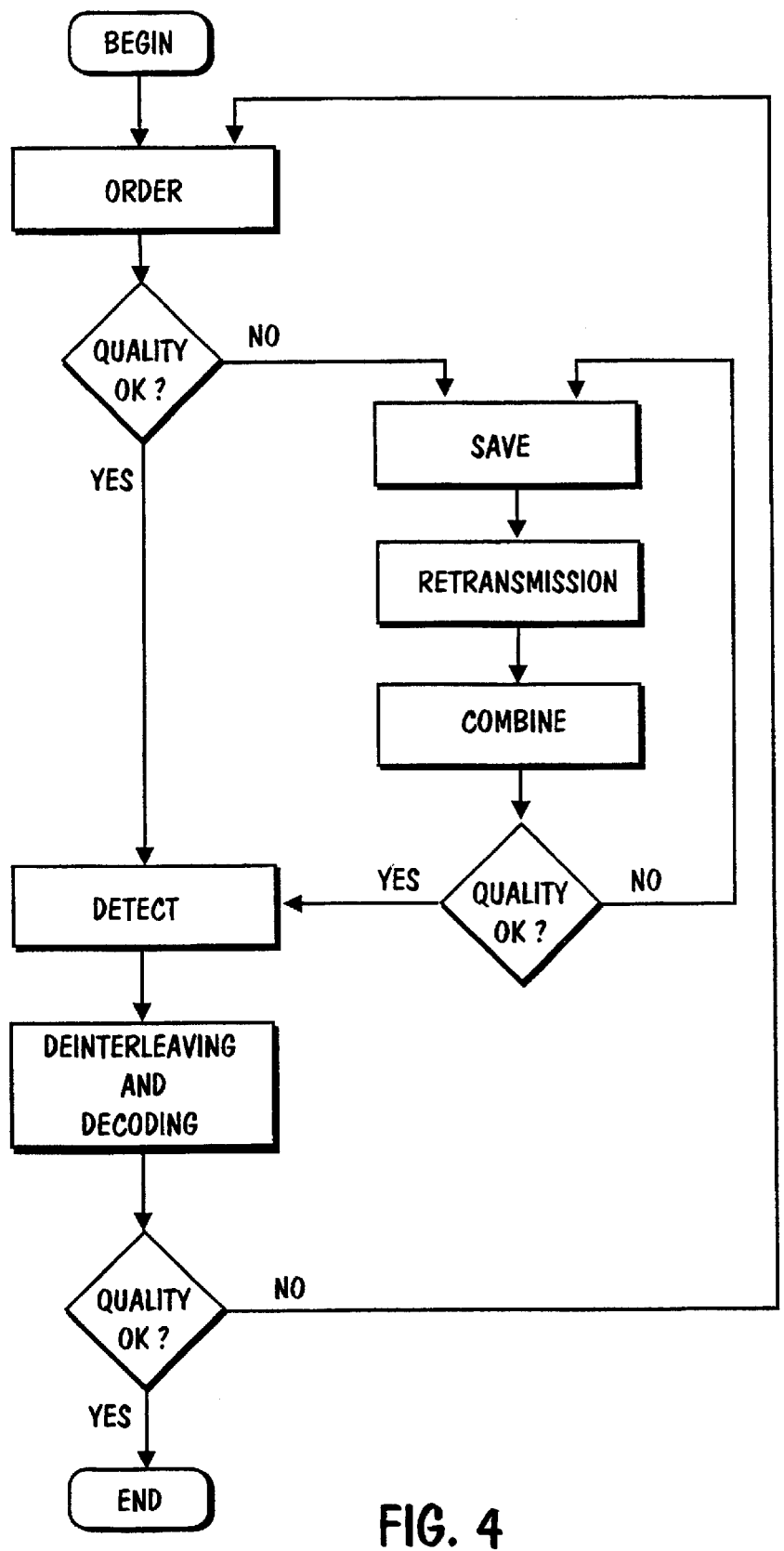
FIG. 4 shows the combination of retransmissions at the receiver.

The transmitting end transmits the packets to the radio path, each packet interleaved in the above manner into four bursts. The transmitting party has provided the receiving party with information on the quantity of packets, their numbering, in how many bursts a packet is sent, and other requisite information. The receiver can operate for example in accordance with FIG. 4. The operation has been explained previously. The operation of the receiver as such is not essential to the invention. What is essential is that the receiver and the system are such that if a faulty data packet has been received, retransmission of the packet is requested. It is preferable, however, if the system uses retransmission coding, i.e. the values of faulty and hence discarded data blocks are stored in the memory of the receiver and they are utilized upon arrival of the retransmission.

Since the packet was sent in several bursts, all of the bursts must first be received in order for it to be possible to deinterleave and decode the packet. Thereafter the correctness of the packet is checked. If, for example, a CRC check shows the packet to be faulty, retransmission of the packet is requested and thereafter it is studied whether the packet becomes free of error. However, in accordance with the invention the packet is not transmitted similarly interleaved as in the first transmission, but the interleaving is changed.

FIG. 7 shows the bursts of the retransmission, in which the interleaving has been changed. While in the original packet in accordance with FIG. 6 the interleaving order from burst 1 to burst 4 was A-B, C-D, E-F, G-H, the interleaving order in the retransmission is F-G, H-A, B-C, D-E. Hence, if for example the original burst 2, having parts C and D, was received incorrectly, in the retransmission of the packet these blocks are located in different bursts. Part C is now in the second half burst of burst 3 and part D in the first half burst of burst 4. Since the parts are located in different bursts, the probability for at least one burst and hence part C or D being received correctly has increased considerably.

It can be seen from the figure that the data in the latter half of the original bursts has been transferred to the first half of the burst in the retransmission. When values received in the retransmission are accumulated with the original values at the receiver, it is quite, possible that despite the Doppler shift and strong interference occurring during a half burst, only one retransmission is sufficient for constructing a faultless packet.

In FIG. 7, the parts located in the half bursts in the retransmission are re-interleaved simply by permuting their relative location.

If the receiver requests a second retransmission of the packet, the order of transmission with regard to the content of successive bursts would be for example H-A, B-C, D-E, F-G. In relation to the previous retransmission, the parts located towards the end of the bursts have been transferred to the beginning of the bursts, and the content of the second half burst has changed. It is particularly to be noted that the data that was originally located at the end of the burst has in the retransmission been transferred adjacent the training sequence in the middle of the burst. This is advantageous, since channel correction is at its most effective specifically in the middle area of the burst. If a third retransmission is necessary, the parts are again re-interleaved in accordance with the principle of the invention.

The transfer of data blocks to be located in half bursts can be expressed as a universally applicable formula (N+1)MOD M, where $0 \leq N < M$ and M is the interleaving depth.

The method of the invention for using re-interleaving in retransmissions has several advantages over the conventional method, since:

- the interference immunity of the partial bursts is essentially improved,
- the rotation caused by the Doppler shift at the end of the burst is not harmful, as the information located towards the end of the burst is interleaved to the beginning of the burst,
- the need for signalling is small and the method can be applied to existing systems, such as the GPRS system,
- the method is very simple to implement. The added feature to the present methods is mainly that the transmitter must inform the receiver in what way the re-interleaving is done,
- the interleaving of the retransmission improves the throughput of transmitted packets over the radio path and improves the endurance of the coding, and
- adaptation to the radio link will become less critical, since the retransmission and re-interleaving deal with fast fading whereas slow normal fading is handled using various coding schemes.

Even though the example described above deals with a case in which the interleaving depth is four and in which the data in the same burst belongs to the same packet, it is obvious that the invention is not restricted to the example. Any interleaving depth is possible, and the data information in the half bursts constituting the burst can belong to different packets. The re-interleaving can be more complex than a straightforward (N+1) MOD M permutation. Neither is it necessary to retransmit the entire data packet, but parts thereof can be transmitted. In such a case, the procedure at the reception can be similar to that disclosed in Finnish Patent Application 971811. If there are errors in one burst, a burst in which the location of the data contained in the half bursts has been changed, or two bursts in whose half bursts the data parts of the original burst are located, can be sent in the retransmission. The different methods are well known to those skilled in the art.

What is claimed is:

1. A method for transmitting packet-switched data in a radio path from a transmitter to a receiver in a system in which the ARQ protocol is used for data transmission and the reception utilizes combination of the soft values of a channel corrector, and in which the bits of the packet to be transmitted are divided in accordance with interleaving depth into successive blocks of equal size to be transmitted in as many radio bursts, characterized in that in response to a repeat request, the blocks of the packet are interleaved differently than in the preceding transmission.

2. A method as claimed in claim 1, characterized in that each block is divided into two equal parts with a length of half of the portion reserved in the burst for user data.

3. A method as claimed in claim 1, characterized in that in the re-interleaving, the part of the block located towards the end of the burst is transferred to the beginning of the burst, as a result of which the last bits of the burst will be located close to the middle of the burst.

4. A method as claimed in claim 1, characterized in that in the re-interleaving, the parts are transferred by permutation as follows:

(N+1)MOD M, where $0 \leq N < M$ and M is the interleaving depth.

5. A method as claimed in claim 1, characterized in that in response to a repeat request, all blocks of the packet are transmitted but in re-interleaved form.

6. A method as claimed in claim 1, characterized in that in response to a repeat request, only that burst which was not accepted at the reception is transmitted but the location of the parts in the burst is changed.

7. A system for transmitting packet-switched data using the ARQ protocol from a transmitter to a receiver, comprising a transmitter part constructing packets of the data to be transmitted, coding the packets and dividing the bits of the packet into equal successive blocks in accordance with interleaving depth, and transmitting the blocks in as many bursts, a receiver part requesting, when necessary, retransmission of a received packet or burst and comprising means for combining the originally received packet and a retransmitted packet and possibly means for combining the original burst and a retransmitted burst, retransmissions being requested until the combined packet or burst exceeds a predetermined quality level, characterized in that in response to a repeat request, the transmitter part interleaves the blocks of the packet differently than in the previous transmission.

8. A system as claimed in claim 7, characterized in that the transmitting part divides each block into two equal parts with a length half of the portion reserved in the burst for user data.

9. A system as claimed in claim 7, characterized in that in the re-interleaving, the transmitting part transfers the block located towards the end of the burst to the beginning of the burst, as a result of which the last bits of the burst are located close to the middle of the burst.

10. A system as claimed in claim 7, characterized in that the transmitting part informs the receiving part in what way the re-interleaving is done.

\* \* \* \* \*